United States Patent
Yang et al.

(10) Patent No.: US 10,773,905 B2
(45) Date of Patent: Sep. 15, 2020

(54) MAGNETIC RACK, CONVEYING TRUCK AND CORRESPONDING CONVEYOR

(71) Applicant: ABB Schweiz AG, Baden (CH)

(72) Inventors: Jibo Yang, Shanghai (CN); Zhaofu Chi, Shanghai (CN); Hao Gu, Shanghai (CN)

(73) Assignee: ABB Schweiz AG, Baden (CH)

(*) Notice: Subject to any disclaimer, the term of this patent is extended or adjusted under 35 U.S.C. 154(b) by 0 days.

(21) Appl. No.: 16/536,943

(22) Filed: Aug. 9, 2019

(65) Prior Publication Data
US 2019/0359433 A1 Nov. 28, 2019

Related U.S. Application Data

(63) Continuation of application No. PCT/CN2017/075865, filed on Mar. 7, 2017.

(51) Int. Cl.
*B65G 54/02* (2006.01)

(52) U.S. Cl.
CPC .................... *B65G 54/02* (2013.01)

(58) Field of Classification Search
CPC ........................................... B65G 54/02
USPC ........................................ 198/619
See application file for complete search history.

(56) References Cited

U.S. PATENT DOCUMENTS

| | | | | |
|---|---|---|---|---|
| 4,129,291 A | * | 12/1978 | Kato | B23Q 1/38 269/73 |
| 4,505,464 A | * | 3/1985 | Chitayat | B23Q 1/015 269/21 |
| 5,058,505 A | * | 10/1991 | Uehira | B60L 13/06 104/284 |
| 5,253,591 A | * | 10/1993 | Rote | B60L 13/10 104/139 |
| 5,641,054 A | * | 6/1997 | Mori | H01L 21/67167 198/619 |

(Continued)

FOREIGN PATENT DOCUMENTS

| | | |
|---|---|---|
| CN | 1305634 A | 7/2001 |
| CN | 1838397 A | 9/2006 |

(Continued)

OTHER PUBLICATIONS

State Intellectual Property Office of The P.R. China, International Search Report & Written Opinion issued in corresponding Application No. PCT/CN2017/075865, dated Dec. 7, 2017, 9 pp.

(Continued)

*Primary Examiner* — Douglas A Hess
(74) *Attorney, Agent, or Firm* — Taft Stettinius & Hollister LLP; J. Bruce Schelkopf

(57) ABSTRACT

A magnetic rack, conveying truck and corresponding conveyor. The magnetic rack includes: a body on which a groove is disposed; at least one magnetic brick on which a first contact part is disposed, the magnetic brick being located in the groove; and a cover which is placed over the groove so as to partially cover the groove, a second contact part and at least one hole being disposed on the cover, the first contact part being contact with the second contact part to fix the magnetic brick in the groove, the at least one hole being used for exposing the at least one magnetic brick.

20 Claims, 4 Drawing Sheets

(56) References Cited

U.S. PATENT DOCUMENTS

| | | | | |
|---|---|---|---|---|
| 5,881,649 | A * | 3/1999 | Hasegawa | H01L 21/67709 104/167 |
| 5,913,401 | A * | 6/1999 | Tamura | H02K 49/102 198/619 |
| 6,045,319 | A * | 4/2000 | Uchida | B65G 54/02 112/DIG. 2 |
| 6,460,466 | B1 | 10/2002 | Stoll et al. | |
| 7,357,085 | B2 * | 4/2008 | Chen | F16C 29/00 104/282 |
| 7,829,026 | B2 * | 11/2010 | Su | G01N 35/0098 422/527 |
| 7,954,434 | B2 * | 6/2011 | Yeo | B65G 49/061 104/281 |
| 8,177,048 | B2 * | 5/2012 | Sato | H01F 38/14 198/619 |
| 9,254,970 | B2 * | 2/2016 | Katayama | H02K 15/0006 |
| 9,300,181 | B2 * | 3/2016 | Maeda | H02K 5/128 |
| 9,701,488 | B2 * | 7/2017 | Paweletz | B65G 54/02 |
| 9,766,258 | B2 * | 9/2017 | Itoh | G01N 35/04 |
| 10,618,749 | B2 * | 4/2020 | Clossner | B65G 37/02 |
| 2013/0126307 | A1 * | 5/2013 | Stoeckle et al. | |
| 2015/0144462 | A1 * | 5/2015 | Weiss | |
| 2017/0050332 | A1 | 2/2017 | Bauer et al. | |
| 2018/0208414 | A1 * | 7/2018 | Gu et al. | |
| 2020/0031594 | A1 * | 1/2020 | Ragan et al. | |

FOREIGN PATENT DOCUMENTS

| | | |
|---|---|---|
| CN | 101139045 A | 3/2008 |
| CN | 104129651 A | 11/2014 |
| CN | 105151803 A | 12/2015 |
| CN | 106286461 A | 1/2017 |
| CN | 106455591 A | 2/2017 |
| JP | S62296789 A | 12/1987 |
| JP | 2000118693 A | 4/2000 |
| JP | 2008142859 A | 6/2008 |

OTHER PUBLICATIONS

The Patent Office of the People'S Republic of China, First Office Action issued in corresponding Chinese application No. 2017800861089, dated Jun. 18, 2020, 12 pp.

* cited by examiner

US 10,773,905 B2

MAGNETIC RACK, CONVEYING TRUCK AND CORRESPONDING CONVEYOR

FIELD OF INVENTION

The present invention relates to the technical field of conveyance, and more specifically, to a magnetic rack, conveying truck and corresponding conveyor.

BACKGROUND OF INVENTION

In some industrial production lines, the production process of products needs to proceed in a dust-free environment. This requires conveyors in production lines not to produce any tiny particle while conveying materials.

Patent CN105151803A discloses a material conveyor for use in a dust-free environment, the conveyor comprising a magnetic gear and a magnetic rack which are not in contact with each other. When the magnetic gear rotates, since there exists a magnetic force between the magnetic gear and the magnetic rack, the magnetic rack will be driven to move in a certain direction, and accordingly a conveying truck with the magnetic gear mounted thereon is driven to move in this direction. Therefore, materials placed on the conveying truck can be conveyed to required positions.

Nevertheless, the above prior art fails to disclose a specific structure of the magnetic rack.

SUMMARY OF INVENTION

It is an objective of the present invention to provide a magnetic rack, conveying truck and corresponding conveyor.

One embodiment of the present invention provides a magnetic rack, which comprises: a body on which a groove is disposed; at least one magnetic brick on which a first contact part is disposed, the brick being located in the groove; and a cover which is placed over the groove so as to partially cover the groove, a second contact part and at least one hole being disposed on the cover, the first contact part being contact with the second contact part to fix the magnetic brick in the groove, the at least one hole being used for exposing the at least one magnetic brick.

Another embodiment of the present invention provides a conveying truck which comprises a truck body and wheels, the conveying truck further comprising: a magnetic rack according to the present invention, which is located at the bottom of the truck body.

A full embodiment of the present invention provides a conveyor which comprises a magnetic gear that is rotatable around a shaft, the conveyor further comprising: a conveying truck according to the present invention, wherein the magnetic gear drives the magnetic rack through magnetic gearing.

The magnetic rack as provided by the present invention requires low manufacturing costs, is easy to manufacture and assemble, boasts good stability, and furthermore, is easy to fit different specifications of magnetic gears.

BRIEF DESCRIPTION OF THE DRAWINGS

The present invention may be better understood by description of embodiments of the present invention, with reference to the accompanying drawings, wherein, FIG. 1 schematically shows a cubic view of a magnetic rack according to one embodiment of the present invention.

Throughout the figures, same or similar reference numbers indicate same or similar elements.

DETAILED DESCRIPTION OF EMBODIMENTS

Description is presented below to specific embodiments of the present invention. It should be noted while describing the embodiments, this specification might not thoroughly describe all features of actual embodiments for the sake of brevity. It should be understood during actual implementation of any one embodiment, just as in the course of any one engineering project or design project, in order to achieve specific objectives of developers and satisfy system-related or business-related restrictions, usually a variety of concrete policies will be made, which also leads to changes from one embodiment to another embodiment. In addition, it may be understood though efforts made during such development might be complicated and tedious, to those of ordinary skills in the art related to content disclosed by the present invention, some variations to design, manufacture or production as made on the basis of technical content disclosed in the present disclosure are merely conventional technical means, and content of the present disclosure should not be construed as being insufficient.

Unless otherwise defined, technical or scientific terminology used in the claims and specification should be general meaning as interpreted by those of ordinary skills in the art. The words "first", "second" and the like are not to be read as any order, amount or importance but only are used to distinguish different components. The word "one" is not to be read as any amount restriction but is to be read as "at least one". The word "comprise" or "include" and the like means an element or article preceding "comprise" or "include" contains an element or article and equivalent elements as enumerated after "comprise" or "include", and does not exclude other element or article. The word "connect" or "link" and the like is neither limited to physical or mechanical connection nor limited to direct or indirect connection.

To make the objective, technical solution and advantages of the present invention clearer, the technical solution of the present invention will be clearly and completely described with reference to the specific embodiments and the accompanying drawings of the present invention. Obviously, the embodiments to be described are merely part of embodiments of the present invention, rather than all embodiments. Based on the embodiments of the present invention, all other embodiments as made by those of ordinary skills in the art without the exercise of any inventive skill should fall in the protection scope of the present invention.

Above all, the embodiments of the present invention provide a magnetic rack.

Figure 1:
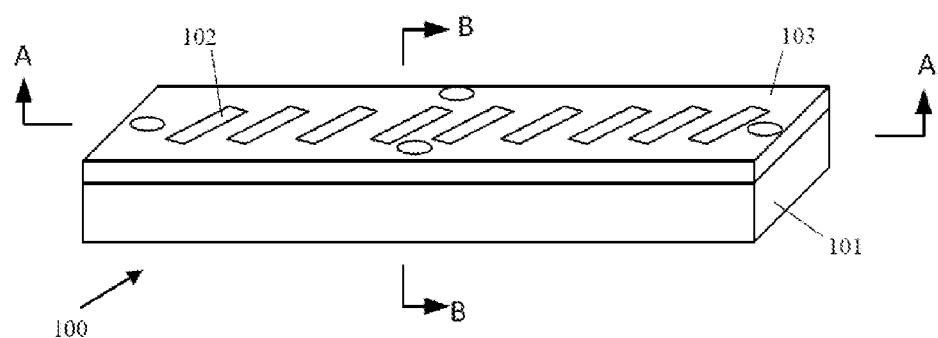
Figure 2:
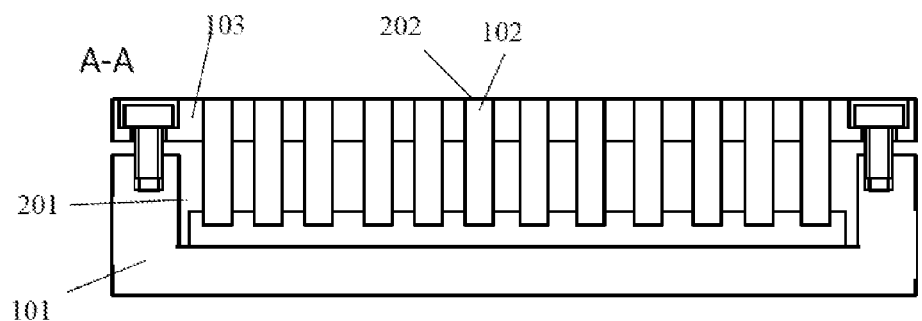
FIG. 2 schematically shows a cutaway view of the magnetic rack in FIG. 1 along a cut line A-A.
Figure 3:
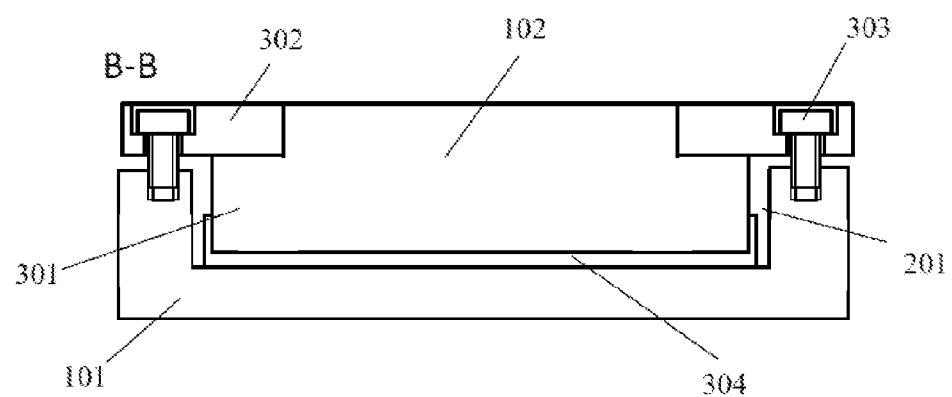
FIG. 3 schematically shows a cutaway view of a magnetic brick in the magnetic rack in FIG. 1 along a cut line B-B according to one embodiment of the present invention.

With reference to FIG. 1 in conjunction with FIGS. 2 and 3, according to one embodiment of the present invention, a magnetic rack 100 may comprise a body 101, at least one magnetic brick 102 and a cover 103.

A groove 201 may be cut in the body 101. A first contact part 301 may be disposed on the magnetic brick 102 which may be located in the groove 201. The cover 103 may be placed over the groove 201 so as to partially cover the groove 201, and a second contact part 302 and at least one hole 202 may be disposed on the cover 103. The second contact part 302 may fix the magnetic brick in the groove 201 through contact with the first contact part 301. The at least one hole 202 may be used for exposing the at least one magnetic brick 102; that is, when the cover 103 covers the body 101, the magnetic brick 102 may be at least partially exposed through the hole 202. The first contact part 301 may fix the magnetic brick 102 in the groove through contact with the second contact part 302, which contact may be surface contact, line contact or point contact.

The groove in the body 101 may be opened along the direction of motion of the magnetic rack 100 during use. When the magnetic rack 100 contains a plurality of magnetic bricks 102, accordingly there may also be a plurality of holes 202 in the cover 201. In this way, each magnetic brick 102 may be at least partially exposed through the hole 202. The hole 202 may be processed by means of a CNC machine and a puncher so as to ensure that its geometric dimensions satisfy relevant requirements.

When the cover 201 tightly covers the body 101, the second contact part 302 disposed on the cover 201 may firmly press the first contact part 301 disposed on the magnetic brick 102, so as to reliably fix the magnetic brick 102 in the groove 201.

According to one embodiment of the present invention, as shown in FIGS. 3 to 6, the first contact part 301 may take a convex shape and may be located at an end of the magnetic brick 102, for example, may be located at an end of the magnetic brick 102 which is in contact with the cover 103. In particular, the first contact part 301 may be located at two ends of the magnetic brick 102 which are in contact with the cover 103, and the first contact part 301 may be regarded as a portion projecting from the body of the magnetic brick 102.

According to one embodiment of the present invention, the first contact part 301 may be located at a position on the magnetic brick 102 which is close to the groove 201. For example, as seen from FIG. 3, the first contact part 301 may be located at the bottom of the magnetic brick 102 which is in contact with the groove 201. This is beneficial as the magnetic brick 102 may be designed to be thinner and the body 101 as well as the groove 201 therein may also be designed to be thinner. Accordingly, as shown in FIG. 3, the second contact part 302 may also be designed to a convex shape corresponding to the shape of the first contact part 301. The second contact part 302 may be located at a position on the cover 201 at a higher height than the first contact part in the depth direction of the groove 201, so that when the cover 201 tightly covers the body 101, the magnetic brick 102 is firmly pressed in the groove 201 by mutual extrusion between the first contact part 301 and the second contact part 302.

Figure 4:
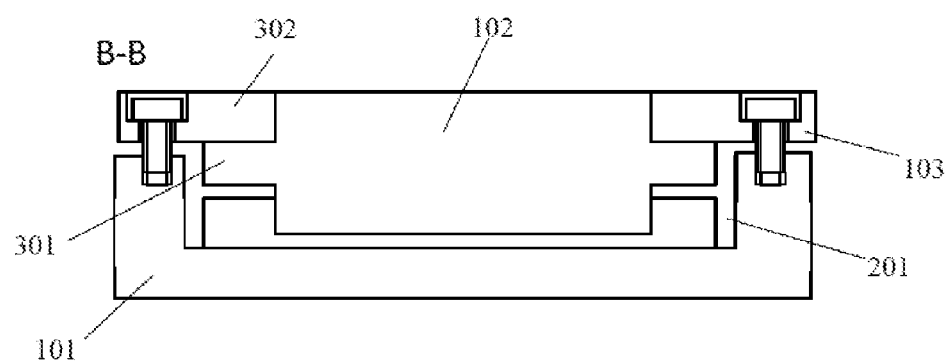
FIG. 4 schematically shows a cutaway view of a magnetic brick in the magnetic rack in FIG. 1 along a cut line B-B according to another embodiment of the present invention.

According to another embodiment of the present invention, the first contact part 301 may also be located at a middle position on the magnetic brick 102 in the depth direction of the groove 201. For example, as shown in FIG. 4, the first contact part 301 may be located at a center position on the magnetic brick 102 in the depth direction of the groove 201. This is beneficial as only one specification of the magnetic brick 102 needs to be produced, regardless of the position distribution of two magnetic poles on the magnetic brick 102. It is because when the magnetic brick 102 is installed in the groove 201, the magnetic brick 102 may be inverted according to the need of magnetic pole distribution. Accordingly, the second contact part 302 may also be designed to a convex shape corresponding to the shape of the first contact part 301. The second contact part 302 may be located at a position on the cover 201 at a higher height than the first contact part in the depth direction of the groove 201, so that when the cover 201 tightly covers the body 101, the magnetic brick 102 is firmly pressed in the groove 201 by mutual extrusion between the first contact part 301 and the second contact part 302.

Figure 5:
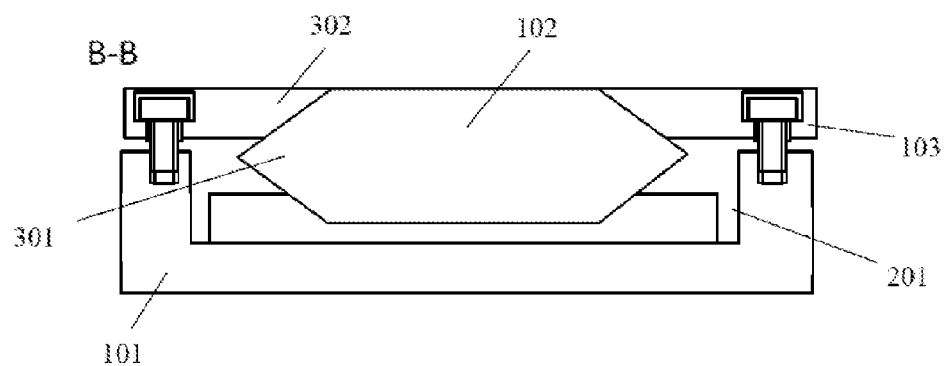
FIG. 5 schematically shows a cutaway view of a magnetic brick in the magnetic rack in FIG. 1 along a cut line B-B according to a further embodiment of the present invention.

According to a further embodiment of the present invention, the first contact part 301 may further be a slope at a certain angle with the plane where the groove 201 is located, and as shown in FIG. 5, the slope may be located at an end of the magnetic brick 102 which is in contact with the second contact part 302. Accordingly, the second contact part 302 may also be designed to a slope shape corresponding to the shape of the slope, so that when the cover 201 tightly covers the body 101, the magnetic brick 102 is firmly pressed in the groove 201 by mutual extrusion between the two slopes.

Figure 6:
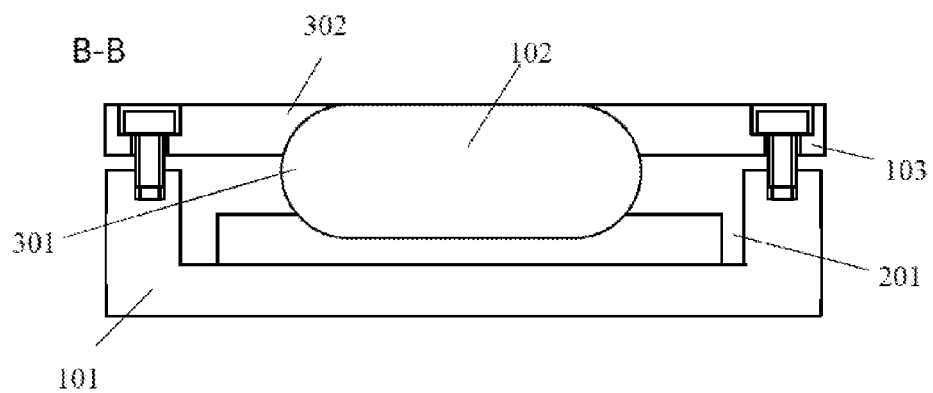
FIG. 6 schematically a cutaway view of a magnetic brick in the magnetic rack in FIG. 1 along a cut line B-B according to a still further embodiment of the present invention.

According to a still further embodiment of the present invention, the first contact part 301 may further be a curved surface, and as shown in FIG. 6, the curved surface may be located at an end of the magnetic brick 102 which is in contact with the second contact part 302. Accordingly, the second contact part 302 may also be designed to a curved surface shape corresponding to the shape of the curved surface, so that when the cover 201 tightly covers the body 101, the magnetic brick 102 is firmly pressed in the groove 201 by mutual extrusion between the two curved surfaces.

It should be stressed the first contact part 301 and second contact part 302 are not limited to the shapes described above, but may take any shape so long as the magnetic brick can be firmly pressed in the groove 201 when the cover 103 tightly covers the body 101.

According to one embodiment of the present invention, as shown in FIG. 3, the cover 103 may be fixed on the body 101 by a screw 303.

According to one embodiment of the present invention, as shown in FIG. 3, further a cushion 304 may be disposed between the groove 201 and the magnetic brick 102. That is, first the cushion 304 is placed in the groove 201, and then the magnetic brick 102 is placed in the groove 201. In this way, when the cover 201 tightly covers the body 101, if there exist slight differences between heights of the plurality of magnetic bricks 102, then the differences may be compensated through elastic deformation of the cushion 304 in the depth direction of the groove 201.

Description has been presented to the magnetic rack according to the embodiments of the present invention. The magnetic rack requires a low cost and can be conveniently produced and assembled. Moreover, when a magnetic gear matching with the magnetic rack for use is changed to another one whose adjacent magnetic poles have different spacing, only by re-making a cover on the magnetic rack and re-assembling the magnetic brick according to positions of holes in the newly made cover, a magnetic rack matching with the new magnetic gear can be fabricated without replacing the entire magnetic rack.

The embodiments of the present invention further provide a conveying truck.

Figure 7:
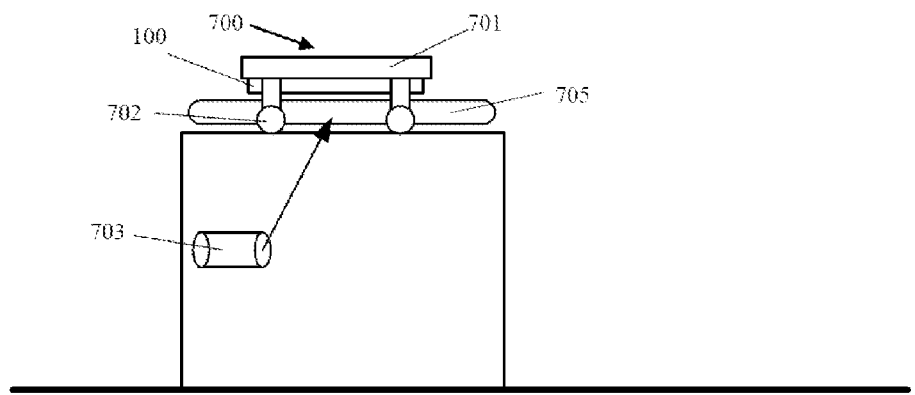
FIG. 7 schematically shows a schematic view of a conveying truck and corresponding conveyor according to one embodiment of the present invention.

As shown in FIG. 7, a conveying truck 700 may comprise a truck body 701, wheels 702 and the magnetic rack 100. The magnetic rack 100 may be located at the bottom of the truck body 701.

In order to make spacing between the magnetic rack 100 and a magnetic gear 703 matching with the magnetic rack be small and even, an adjuster may be disposed between the truck body 701 and the magnetic rack 100, which may be used for adjusting the spacing between the truck body 701 and the magnetic rack 100.

Figure 8:
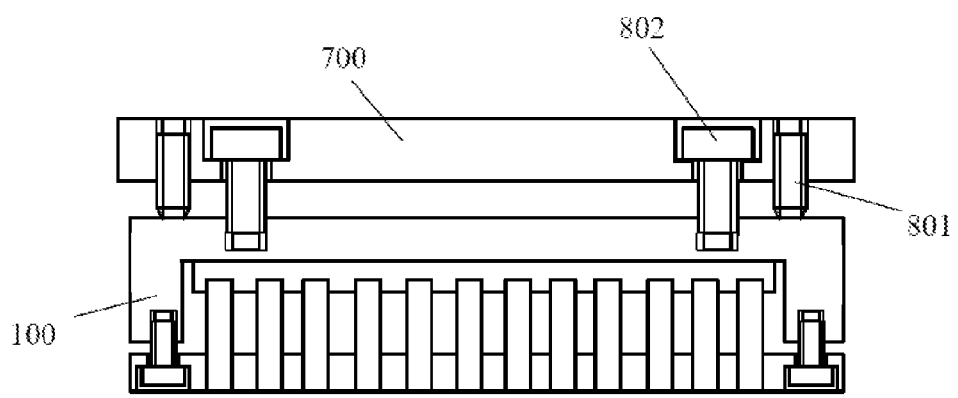
FIG. 8 schematically shows a schematic view of an adjuster and a fastener in the conveying truck according to one embodiment of the present invention.

According to one embodiment of the present invention, with reference to FIG. 8, the adjuster may be an adjusting screw 801. For example, the spacing between the truck body 701 and the magnetic rack 100 may be adjusted by three adjusting screws, each of which has one end connected to the truck body 701 and has the other end connected to the magnetic rack 100. When the adjusting screw 801 is turned, the spacing between the truck body 701 and the magnetic rack 100 is changed, and in turn, the spacing between the magnetic rack 100 and the magnetic gear 703 is changed.

According to one embodiment of the present invention, with reference to FIG. 8, a fastening screw 802 may further be disposed, which has one end fixed on the truck body 701 and has the other end connected with the magnetic rack 100. When the spacing between the truck body 701 and the magnetic rack 100 has been adjusted to an expected value, the fastening screw 802 will be used to fix the magnetic rack 100 on the truck body 701 to ensure that the spacing will not be changed any more.

Description has been presented to the conveying truck according to the embodiments of the present invention. A magnetic rack on the conveying truck requires a low cost, is convenient to produce and assemble and moreover, can match with different specifications of magnetic gears for use.

The embodiments of the present invention further provide a conveyor. As shown in FIG. 7, the conveyor comprises a magnetic gear 703 that is rotatable around a shaft 705, and the conveying truck 700, wherein the magnetic gear 703 may drive, through magnetic gearing, the magnetic rack to move.

The embodiments of the present disclosure have been illustrated above, but are not intended to limit the present invention. Various variations and changes to the present invention will be apparent to those skilled in the art. Any modification, equivalent replacement, improvement and so on as made under the spirit and principle of the present invention should be included in the scope of the claims of the present invention.

The invention claimed is:

1. A magnetic rack, comprising:
   a body on which a groove is disposed;
   at least one magnetic brick having a first contact part, the brick being located in the groove; and
   a cover having a second contact part and at least one hole, the cover being placed over the groove so as to partially cover the groove, the first contact part being in contact with the second contact part to fix the magnetic brick in the groove, the at least one hole being used for exposing the at least one magnetic brick.

2. The magnetic rack according to claim 1, wherein the first contact part takes a convex shape and is located at an end of the magnetic brick.

3. The magnetic rack according to claim 2, wherein the first contact part is located at a position on the magnetic brick which is close to the groove.

4. The magnetic rack according to claim 2, wherein the first contact part is located at a middle position on the magnetic brick along a depth direction of the groove.

5. The magnetic rack according to claim 1 wherein the first contact part is a slope at a certain angle with a plane where the bottom of the groove is located, the slope being located at an end of the magnetic brick.

6. The magnetic rack according to claim 1, further comprising:
   a cushion which is located between the magnetic brick and the groove.

7. The magnetic rack according to claim 1, wherein the cover is fixed on the body by a screw.

8. A conveying truck, comprising a truck body and wheels, further comprising:
   magnetic rack according to claim 1, which is located at the bottom of the truck body.

9. The conveying truck according to claim 8, further comprising:
   an adjuster which is located between the truck body and the magnetic rack, for adjusting spacing between the truck body and the magnetic rack.

10. The conveying truck according to claim 9, wherein the adjuster is an adjustable screw.

11. The conveying truck according to claim 9, further comprising:
    a fastening screw for fixing the magnetic rack at the truck body when the spacing between the truck body and the magnetic rack has been adjusted to an expected value.

12. A conveyor comprising a magnetic gear that is rotatable around a shaft, comprising:
    a conveying truck according to claim 9, the magnetic gear driving the magnetic rack through magnetic gearing.

13. The conveyor according to claim 12, wherein the adjuster is an adjustable screw.

14. The conveyor according to 12, further comprising:
    a fastening screw for fixing the magnetic rack at the truck body when the spacing between the truck body and the magnetic rack has been adjusted to an expected value.

15. The conveying truck according to claim 9, further comprising:
    a fastening screw for fixing the magnetic rack at the truck body when the spacing between the truck body and the magnetic rack has been adjusted to an expected value.

16. The conveying truck according to claim 8, wherein the first contact part takes a convex shape and is located at an end of the magnetic brick.

17. The conveying truck according to claim 16, wherein the first contact part is located at a position on the magnetic brick which is close to the groove.

18. The conveying truck according to claim 16, wherein the first contact part is located at a middle position on the magnetic brick along a depth direction of the groove.

19. The conveying truck according to claim 8, wherein the first contact part is a slope at a certain angle with a plane where the bottom of the groove is located, the slope being located at an end of the magnetic brick.

20. The conveyor truck according to claim 8, further comprising:
    a cushion which is located between the magnetic brick and the groove.

* * * * *